United States Patent
Arai

(10) Patent No.: US 8,692,907 B2
(45) Date of Patent: Apr. 8, 2014

(54) IMAGE CAPTURING APPARATUS AND IMAGE CAPTURING METHOD

(75) Inventor: Hiroaki Arai, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 323 days.

(21) Appl. No.: 13/085,513

(22) Filed: Apr. 13, 2011

(65) Prior Publication Data

US 2012/0062768 A1    Mar. 15, 2012

Related U.S. Application Data

(60) Provisional application No. 61/382,190, filed on Sep. 13, 2010.

(51) Int. Cl.
*H04N 5/262* (2006.01)
*H04N 5/228* (2006.01)
*H04N 5/222* (2006.01)

(52) U.S. Cl.
USPC ............... 348/239; 348/222.1; 348/333.01; 348/333.05; 348/333.11

(58) Field of Classification Search
USPC ............... 348/207.99–207.11, 222.1, 348/231.99–240.3, 239, 333.01–333.12; 382/103, 162–167, 181, 232–253
See application file for complete search history.

(56) References Cited

U.S. PATENT DOCUMENTS

| | | | | |
|---|---|---|---|---|
| 7,453,506 | B2 * | 11/2008 | Li | 348/333.12 |
| 7,853,140 | B2 * | 12/2010 | Sugimoto | 396/296 |
| 8,063,945 | B2 * | 11/2011 | Hoshino | 348/222.1 |
| 8,264,588 | B2 * | 9/2012 | Fujio et al. | 348/333.12 |
| 2002/0114535 | A1 * | 8/2002 | Luo | 382/282 |
| 2003/0071904 | A1 * | 4/2003 | Karasaki et al. | 348/231.3 |
| 2005/0251015 | A1 * | 11/2005 | Takikawa et al. | 600/407 |
| 2006/0072847 | A1 | 4/2006 | Chor et al. | |
| 2006/0170791 | A1 * | 8/2006 | Porter et al. | 348/231.3 |
| 2008/0024643 | A1 * | 1/2008 | Kato | 348/333.01 |
| 2008/0246852 | A1 * | 10/2008 | Mori | 348/222.1 |
| 2009/0052746 | A1 * | 2/2009 | Aoki et al. | 382/115 |
| 2009/0208056 | A1 * | 8/2009 | Corcoran et al. | 382/103 |
| 2009/0208118 | A1 * | 8/2009 | Csurka | 382/228 |
| 2009/0268076 | A1 * | 10/2009 | Kawamura et al. | 348/333.12 |
| 2010/0134641 | A1 * | 6/2010 | Marti et al. | 348/222.1 |
| 2010/0214445 | A1 | 8/2010 | Chronqvist | |
| 2010/0290673 | A1 * | 11/2010 | Miyashita | 382/103 |
| 2010/0290705 | A1 | 11/2010 | Nakamura | |

(Continued)

FOREIGN PATENT DOCUMENTS

EP    2 207 341 A1    7/2010
JP    2007-295203    11/2007

OTHER PUBLICATIONS

Extended European Search Report issued Mar. 29, 2012 in Patent Application No. 11167242.4.

(Continued)

*Primary Examiner* — Michael Osinski

(74) *Attorney, Agent, or Firm* — Oblon, Spivak, McClelland, Maier & Neustadt, L.L.P.

(57) ABSTRACT

An image capturing apparatus that captures an image, detects a subject from the captured image, and generates a plurality of pieces of composition candidate data by trimming the captured image based on a size and position of the detected subject.

9 Claims, 16 Drawing Sheets

(56) References Cited

U.S. PATENT DOCUMENTS

| | | | |
|---|---|---|---|
| 2011/0050915 A1* | 3/2011 | Wang et al. | 348/207.99 |
| 2011/0090341 A1* | 4/2011 | Ikewada et al. | 348/152 |
| 2011/0273474 A1* | 11/2011 | Iwayama | 345/636 |
| 2011/0292287 A1* | 12/2011 | Washington | 348/571 |
| 2012/0281119 A1* | 11/2012 | Ohba et al. | 348/240.2 |
| 2013/0235086 A1* | 9/2013 | Otake | 345/660 |

OTHER PUBLICATIONS

Partial European Search Report issued Nov. 18, 2011, in European Patent Application No. 11167242.4.

\* cited by examiner

IMAGE CAPTURING APPARATUS AND IMAGE CAPTURING METHOD

CROSS REFERENCE TO RELATED APPLICATION

The present application claims the benefit of the earlier filing date of U.S. Provisional Patent Application Ser. No. 61/382,190 filed on Sep. 13, 2010, the entire contents of which is incorporated herein by reference.

BACKGROUND

1. Field of the Disclosure

The present disclosure relates to an image capturing apparatus and an image capturing method that are preferably applied to apparatuses having various types of image capturing functions, such as electronic still cameras and mobile phone terminal apparatuses with a camera function. More specifically, the present disclosure relates to a technique of assisting determination of a composition at the time of capturing an image.

2. Description of the Related Art

According to the related art, when an operator captures a still image using an image capturing apparatus, such as an electronic still camera or a mobile phone terminal apparatus with a camera function, the operator causes a display unit of the image capturing apparatus to display the image that is being captured and checks the displayed image. If the checked image is appropriate as an image to be taken, the operator presses an operation button corresponding to a shutter button and records (stores) the image.

When such image capturing is performed, the composition of the captured image is adjusted in the following manner. That is, for example, the operator adjusts the angle of view using a zoom lens, which is attached as an image capturing lens, so that an image of a subject with an appropriate size can be captured. Also, the operator directly operates the image capturing apparatus in order to determine a composition in which the subject is placed at an appropriate position in the set angle of view.

The angle of view can be adjusted in a similar manner by extracting part of captured image data, instead of using the zoom lens. In recent years, the number of pixels of an image sensor provided in an image capturing unit has been increasing, and thus an image with a sufficiently high resolution can be obtained even when part of an image is extracted.

FIG. 21 is a diagram illustrating an example of state transition in the case of capturing a still image using an image capturing apparatus according to the related art.

First, when the image capturing apparatus is started (step S11), a so-called through display state occurs in which an image captured by an image capturing unit in that state is displayed as is on a display unit constituting an electronic view finder (step S1). In this state, if an operator performs half-press of a shutter button, that is, if the operator halfway presses the shutter button of the image capturing apparatus (step S12), the state changes to an adjustment/fixing state (step S2). In the adjustment/fixing state, an autofocus process of focusing a subject of the image and a process of adjusting an exposure state are performed, and an image that is in a state where the focus is fixed and that is ready to be captured is displayed on the display unit.

If the half-press of the shutter button is released in this adjustment/fixing state (step S14), the state returns to the through display state in step S1. On the other hand, if full-press of the shutter button is performed, that is, if the shutter button is fully pressed in the adjustment/fixing state (step S13), an image taking process is performed in which the image data captured by the image capturing unit at the timing when the shutter button is pressed is taken (step S3). Then, the state returns to the through display state in step S1.

Image capturing is performed in this manner. Generally, the composition of an image is adjusted by the operator by determining whether the composition of the image obtained in the adjustment/fixing state in step S2 is appropriate or not.

SUMMARY OF THE DISCLOSURE

Japanese Unexamined Patent Application Publication No. 2007-295203 describes a process of trimming a captured image during editing after capturing the image so as to obtain an image of a subject with an appropriate composition.

However, such a work of trimming an image during editing after capturing the image takes time disadvantageously, and it is preferred that an image can be taken with an appropriate composition during an image capturing process.

Also, Japanese Unexamined Patent Application Publication No. 2007-295203 describes a technique of arranging and displaying an original image and a plurality of types of trimmed images that are scaled down on a display of an editing device during editing. If such a technique of displaying scaled down images is applied to display on an electronic view finder of an image capturing apparatus, the following problem may occur. That is, since the display unit serving as the electronic view finder of the image capturing apparatus is a relatively small display screen, the trimmed images displayed thereon are very small and are very difficult to be seen.

Accordingly, it is desirable to enable easy execution of guiding for an appropriate composition at the time of image capturing and image capturing with a guided composition.

According to an embodiment of the present disclosure, an image capturing apparatus captures an image, detects a subject from the captured image, generates a plurality of pieces of composition candidate data by trimming the captured image based on a size and position of the detected subject, and displays each of the plurality of pieces of composition candidate data If an operation instruction of an image capturing timing is provided in a state where any of the plurality of pieces of composition candidate data is displayed, image data that is extracted using the piece of composition candidate data displayed at the time is stored.

According to the embodiment of the disclosure, composition candidates are sequentially displayed in a captured image displayed on a display unit, so that an image can be easily captured with an optimal composition.

DESCRIPTION OF THE PREFERRED EMBODIMENTS

Embodiments of the present disclosure will be described in the following order.

Figure 4:
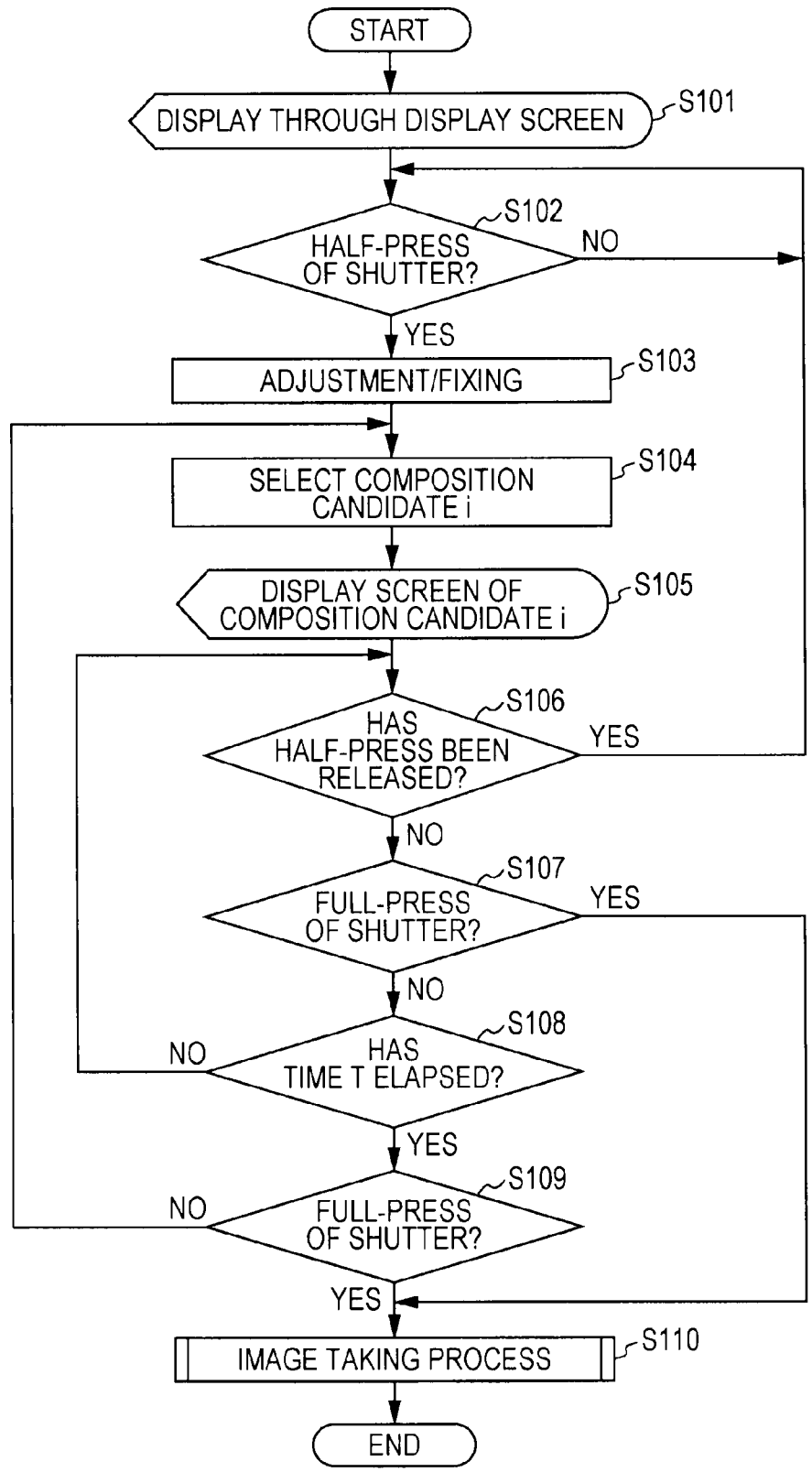
FIG. 4 is a flowchart illustrating an example of an image capturing process according to an embodiment of the present disclosure.
Figure 5:
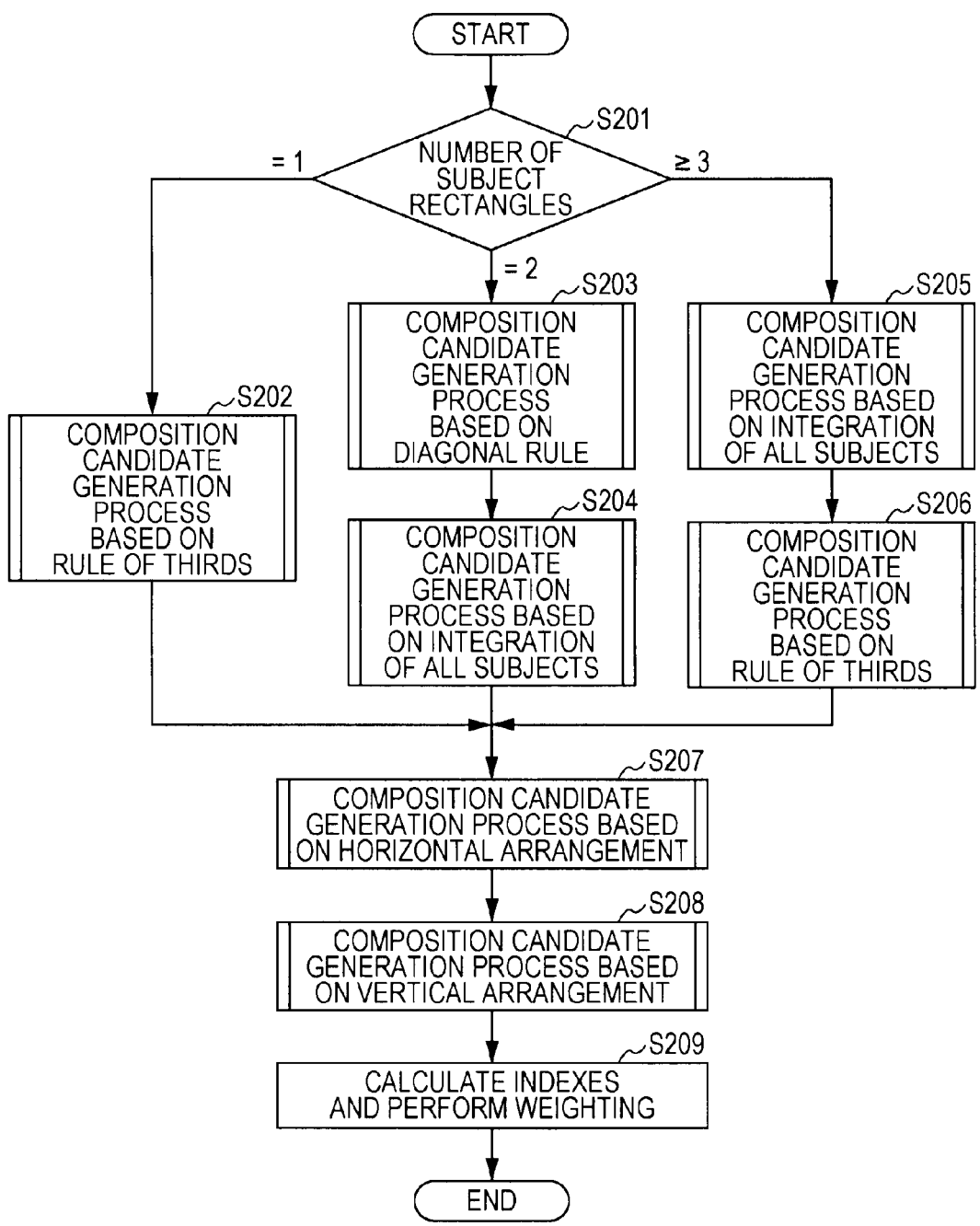
FIG. 5 is a flowchart illustrating an example of a composition candidate generation process according to an embodiment of the present disclosure.

1. Example of entire configuration of apparatus according to embodiment (FIG. 1)
2. Example of configuration related to image capturing according to embodiment (FIG. 2)
3. Example of process at the time of image capturing according to embodiment (FIGS. 3 and 4)
4. Example of process of selecting composition candidate according to embodiment (FIGS. 5 and 6)
5. Specific examples of composition candidate according to embodiment (FIGS. 7 to 15)
6. Specific display examples according to embodiment (FIGS. 16 to 18B)
7. Example of process at the time of image capturing according to another embodiment (FIG. 19)
8. Display example of subject frame according to another embodiment (FIG. 20)
9. Other modifications 1. Example of Entire Configuration of Apparatus According to Embodiment First, an entire configuration of an apparatus according to an embodiment of the present disclosure will be described with reference to FIG. 1.

In this embodiment, a mobile phone terminal apparatus equipped with a camera is applied as an image capturing apparatus.

Figure 1:
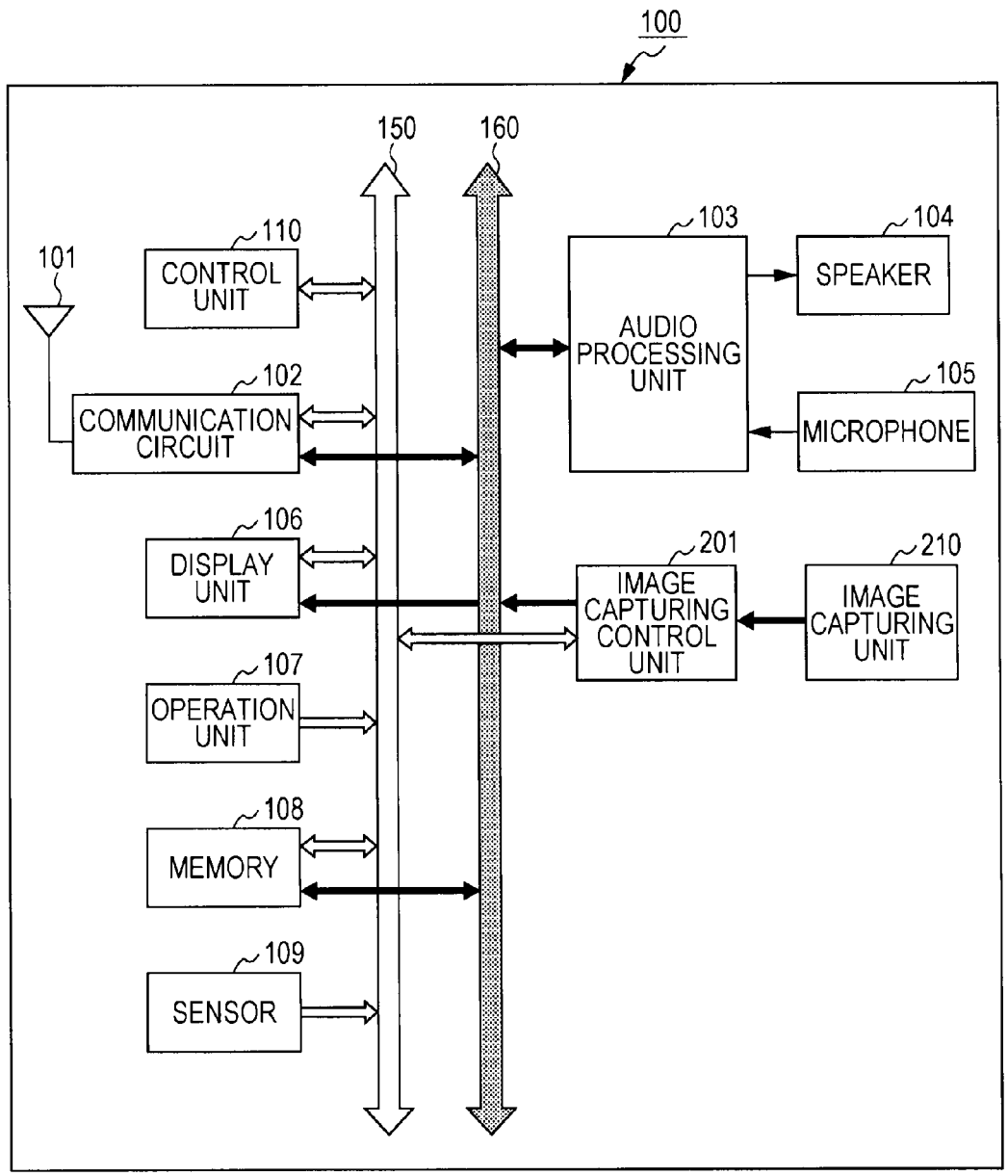
FIG. 1 is a block diagram illustrating an example of an entire configuration of an apparatus according to an embodiment of the present disclosure.

As illustrated in FIG. 1, a mobile phone terminal apparatus 100 includes a communication circuit 102 connected to an antenna 101, and the communication circuit 102 performs wireless communication with a base station provided for wireless phones. Audio data in data received by the communication circuit 102 is supplied to an audio processing unit 103 via a data line 160. The audio data supplied to the audio processing unit 103 is demodulated, is supplied as an analog audio signal to a speaker 104, and is output therefrom. Also, an audio signal input to a microphone 105 is modulated into audio data in a certain format by the audio processing unit 103, and the obtained audio data is supplied to the communication circuit 102 via the data line 160 and is wirelessly transmitted.

If mail data or web browser screen data is received by the communication circuit 102, the received data is processed.

Such a wireless communication process is performed under control performed by a control unit 110. The control unit 110 is configured to transmit control data to/receive control data from each unit of the mobile phone terminal apparatus 100 via a control line 150. Mode setting for capturing an image (described below) is also performed under control performed by the control unit 110.

Also, the mobile phone terminal apparatus 100 includes a display unit 106 including a liquid crystal image display panel or the like, whereby various types of display is performed in the mobile phone terminal apparatus 100. At the time of performing an image capturing function (described below), an image that is being captured is displayed on the display unit 106, which functions as an electronic view finder of the image capturing apparatus. A display panel constituting the display unit 106 includes a touch panel, for example, and is capable of performing various types of operations related to display when an operator touches the surface of the display panel with his/her finger.

Also, the mobile phone terminal apparatus 100 includes an operation unit 107 including various types of operation buttons. The operation data of the operation unit 107 is supplied to the control unit 110. The operation unit 107 includes numeric keys for dialing for the mobile phone terminal, various types of function keys, and a shutter button for performing an image capturing operation. With the shutter button according to this embodiment, two stages of operations can be performed: an operation of halfway pressing the button; and an operation of fully pressing the button.

Also, the function keys provided in the operation unit 107 include a key for selecting an image capturing mode. The shutter button and the key for selecting an image capturing mode may function as a button or key for performing another operation when an image capturing process is not being performed.

Also, the mobile phone terminal apparatus 100 includes a memory 108, which stores various types of data that is necessary for the mobile phone terminal apparatus 100. The memory 108 also stores image data obtained through image capturing. Also, the memory 108 stores a program for performing a process of generating composition candidates during image capturing and performing display and image capturing, which is a feature of this embodiment. As the memory for storing image data or the like, a memory card that is removable from the body of the apparatus may be used.

Furthermore, the mobile phone terminal apparatus 100 according to this embodiment includes a sensor 109 for detecting the orientation of the casing constituting the main body of the mobile phone terminal apparatus 100. An output of the sensor 109 is determined by the control unit 110, so that the orientation of the mobile phone terminal apparatus 100 can be determined. Specifically, whether the mobile phone terminal apparatus 100 is vertically oriented or horizontally oriented is determined.

Also, the mobile phone terminal apparatus 100 according to this embodiment includes an image capturing control unit 201 and an image capturing unit 210. The image capturing control unit 201 causes the image capturing unit 210 to perform an image capturing process on the basis of an instruction provided from the control unit 110. The image data obtained through the image capturing performed by the image capturing unit 210 is displayed on the display unit 106 and is stored in the memory 108. Alternatively, the image data obtained through the image capturing may be wirelessly transmitted from the communication circuit 102.

2. Example of Configuration Related to Image Capturing According to Embodiment

Figure 2:
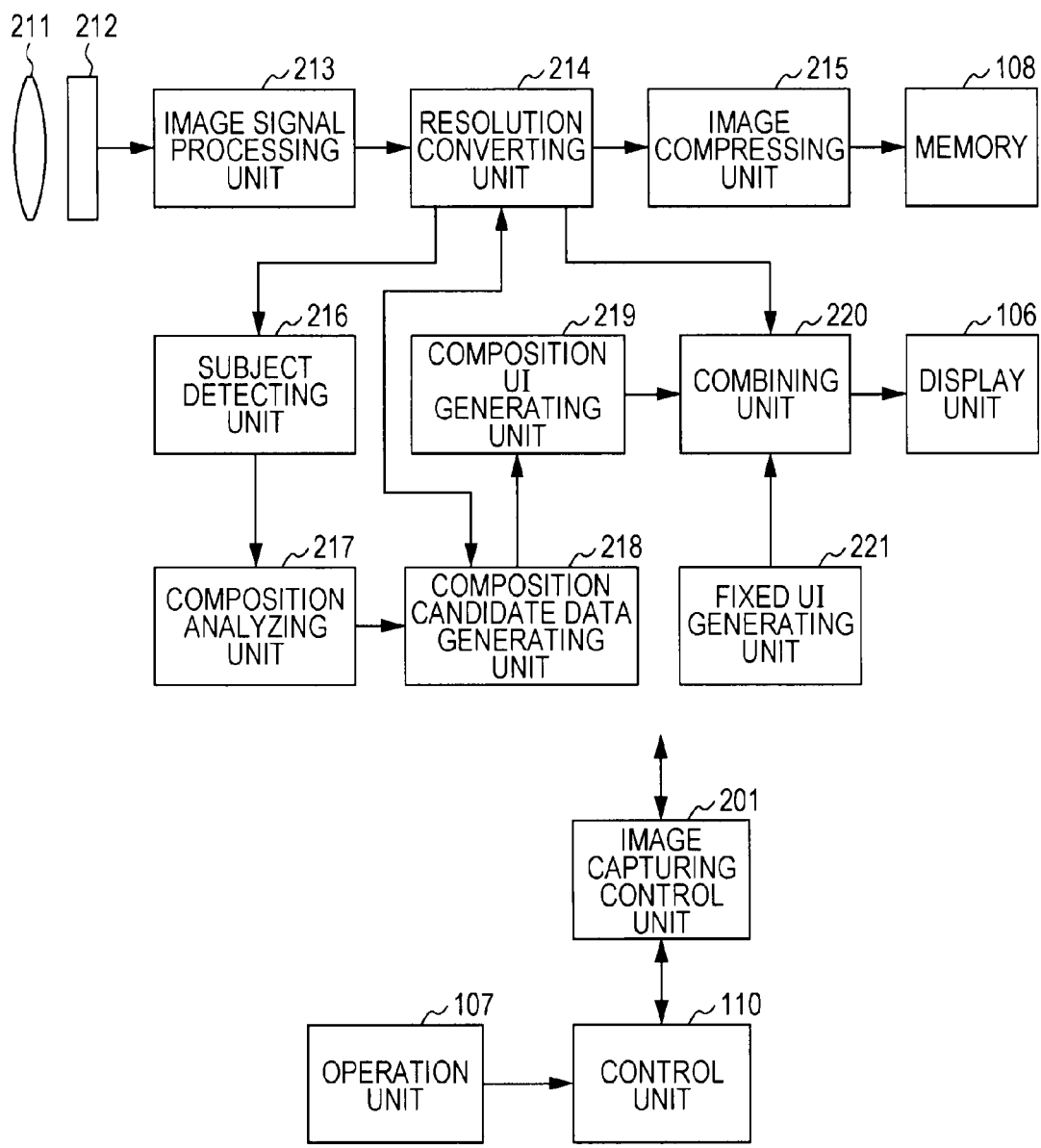
FIG. 2 is a block diagram illustrating an example of a configuration related to image capturing of the apparatus according to an embodiment of the present disclosure.

Next, a description will be given of a specific configuration of the image capturing unit 210 provided in the mobile phone terminal apparatus 100 according to this embodiment. FIG. 2 illustrates a peripheral configuration related to image capturing, in addition to the configuration of the image capturing unit 210.

The image capturing unit 210 includes an optical system 211 including a lens, and an optical image is formed on an image capturing surface of an image sensor 212 via the optical system 211. The lens constituting the optical system 211 may have a configuration including a zoom lens, and has a configuration in which focus adjustment can be performed by adjusting a focus lens. Furthermore, an iris mechanism for adjusting the amount of light may be included in the optical system 211.

As the image sensor 212, a solid-state image capturing device, such as a charge-coupled device (CCD)-type imager or a complementary metal-oxide semiconductor (CMOS)-type imager. The image sensor 212 outputs an image signal. The output image signal is supplied to an image signal processing unit 213, which performs an image capturing process in order to generate appropriate image data. The image data output from the image signal processing unit 213 is supplied to a resolution converting unit 214 and is converted into image data having the number of pixels to be stored. The image data is also converted into image data to be displayed. The image data that has been converted into image data having the number of pixels to be recorded is supplied to an image compressing unit 215, which performs an image compression process using a format for storage, and the compressed and encoded image data is stored in the memory 108.

When composition data is supplied from a composition candidate data generating unit 218 (described below) to the resolution converting unit 214, image data is extracted using the composition data, the extracted image data is converted into image data having an appropriate resolution, and then the image data is supplied to the image compressing unit 215.

Also, the image data converted for display by the resolution converting unit 214 is supplied to a combining unit 220, which combines the image data with a composition user interface (UI) supplied from a composition UI generating unit 219 and a fixed UI supplied from a fixed UI generating unit 221, and supplies the combined image data to the display unit 106 so as to be displayed thereon.

Also, the image data converted for display by the resolution converting unit 214 is supplied to a subject detecting unit 216. The subject detecting unit 216 performs an image analysis process on an image corresponding to the image data, thereby detecting whether a subject exists in the image or not. Here, the subject means a characteristic portion of an image, such as the face of a person or animal, or an object in the background. The subject detecting unit 216 has a function of detecting subjects in a plurality of portions from one image (image of one frame). If a subject is detected by the subject detecting unit 216, the data about the position and size in the image of the subject is output.

The data about the position and size of the subject is output from the subject detecting unit 216 and is supplied to a composition analyzing unit 217. The composition analyzing unit 217 analyzes an appropriate composition on the basis of the number of subjects in one image and the position and size thereof. Here, the appropriate composition is a composition in which a subject is positioned in an appropriate state, which is generated by extracting an image of the subject and its peripheral portion from one image. A specific example of a process of analyzing an appropriate composition will be described below.

The data of composition candidates obtained through the analysis performed by the composition analyzing unit 217 is supplied to the composition candidate data generating unit 218. On the basis of the data of composition candidates, the composition candidate data generating unit 218 generates one or a plurality of pieces of composition candidate data indicating the range to be extracted from the image, and supplies the generated composition candidate data to the composition UI generating unit 219.

On the basis of the supplied composition candidate data, the composition UI generating unit 219 generates composition UI data for displaying a frame defining the range to be extracted from the image. If there are a plurality of pieces of composition candidate data, composition UI data of a plurality of frames is generated. The generated composition UI data is supplied to the combining unit 220 and is combined with the image data to be displayed that is supplied from the resolution converting unit 214 to the combining unit 220. The timing to combine the composition UI data and the order of displaying the individual frames based on the composition UI data of the plurality of frames are set in accordance with an instruction provided from the control unit 110.

Also, the combining unit 220 combines various types of marks for guide display and information that are supplied from the fixed UI generating unit 221 and that are displayed on a display screen during image capturing.

The above-described image capturing process performed by the image capturing unit 210 is controlled by the image capturing control unit 201 on the basis of an instruction provided from the control unit 110. The control unit 110 transmits an instruction about image capturing on the basis of a shutter button operation or a setting operation of various types of modes performed in the operation unit 107.

If a shutter button operation for providing an instruction to perform image capturing is performed in a state where an image combined with any frame by the combining unit 220 is displayed on the display unit 106, the composition data at the time is transmitted from the composition candidate data generating unit 218 to the resolution converting unit 214 under control performed by the image capturing control unit 201. The resolution converting unit 214 extracts image data using the composition data supplied thereto and transmits the image data to the image compressing unit 215, thereby causing the memory 108 to store it.

If a shutter button operation for providing an instruction to perform image capturing is performed in a state where an image that is not combined with any frame of composition is displayed on the display unit 106, a process of extracting an image is not performed by the resolution converting unit 214.

3. Example of Process at the Time of Image Capturing According to Embodiment

Next, an example of a process of performing image capturing in the configurations illustrated in FIGS. 1 and 2 will be described with reference to the state transition chart in FIG. 3 and the flowchart in FIG. 4.

First, the transition of an operation mode in a state where the image capturing unit 210, which is a camera function unit of the mobile phone terminal apparatus 100, is started will be described with reference to FIG. 3.

Figure 3:
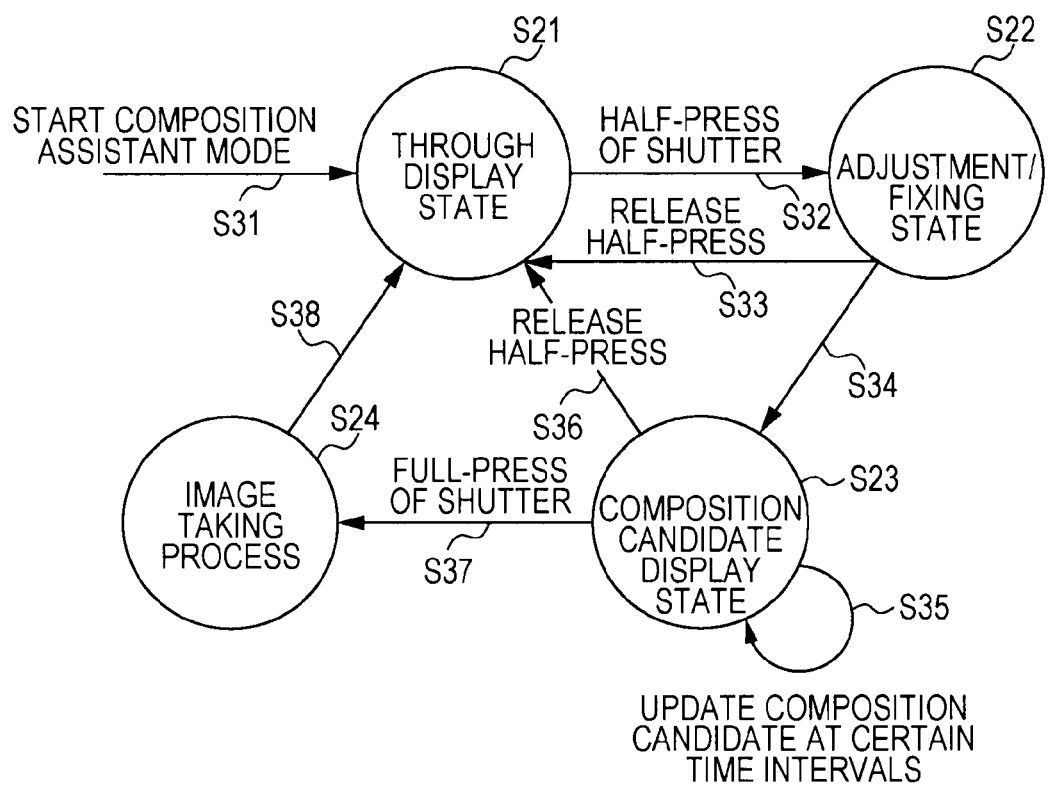
FIG. 3 is an explanatory view illustrating state transition at the time of image capturing according to an embodiment of the present disclosure.
Figure 21:
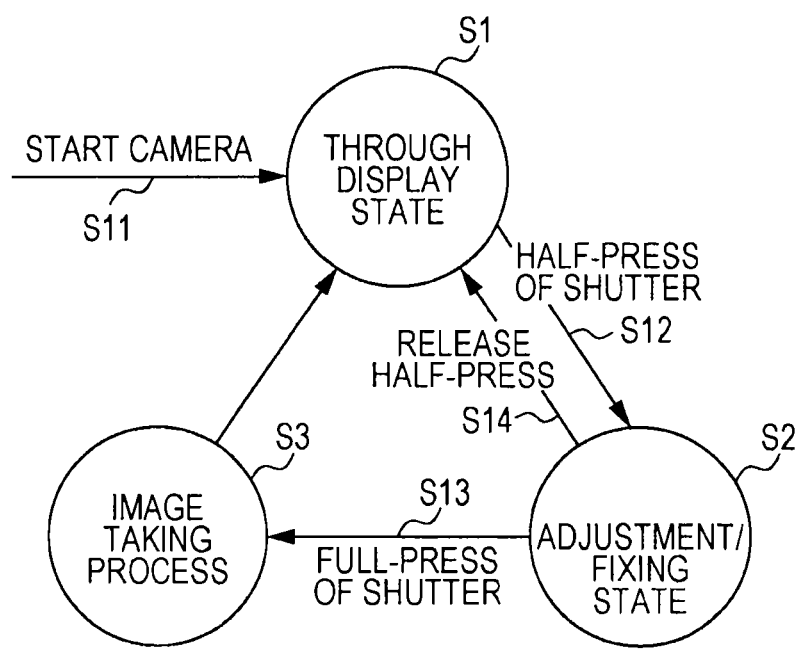
FIG. 21 is an explanatory view illustrating an example of state transition at the time of image capturing according to the related art.

The state transition chart in FIG. 3 illustrates an operation example in a case where a composition assistant mode is set as an image capturing mode. As for the state transition in a normal image capturing mode in which the composition assistant mode is not set, the state transition according to the related art illustrated in FIG. 21 can be applied.

Now, a description will be given of the state transition in FIG. 3. First, the image capturing function of the apparatus is started in the composition assistant mode (step S31), then a so-called through display state occurs in which an image captured by the image capturing unit 210 in that state is displayed as is on the display unit 106 (step S21). In this state, if the operator performs half-press of the shutter button, that is, if the operator halfway presses the shutter button of the operation unit 107 (step S32), the state changes to an adjustment/fixing state (step S22). In the adjustment/fixing state, an autofocus process of focusing a subject in an image and a process of adjusting an exposure state are performed, and an image that is in a state where the focus is fixed and that is ready to be captured is displayed on the display unit 106.

After the state has changed to the adjustment/fixing state, the state changes to a composition candidate display state (step S23). In the composition candidate display state, composition UI data generated by the composition UI generating unit 219 (FIG. 2) is combined with the displayed image. In this state, a composition candidate is updated to another composition candidate at a certain time interval (step S35). Then, if the half-press of the shutter button is released in the composition candidate display state (step S36), the state returns to the through display state in step S21. On the other hand, if full-press of the shutter button is performed, that is, if the shutter button is fully pressed in the composition candidate display state (step S37), an image taking process is performed, that is, image data that is being captured is trimmed and taken using the composition candidate that is displayed at the time when the shutter button is pressed (step S24). Then, the state returns to the through display state in step S21 (step S38).

Next, the flow of an image capturing process that is performed under control performed by the control unit 110 in the composition assistant mode will be described with reference to the flowchart in FIG. 4.

First, in a state where the through display screen is displayed (step S101), the control unit 110 determines whether the shutter button is in a half-press state (step S102). The state of the through display screen is maintained unless the shutter button is operated.

If the control unit 110 determines that the shutter button is in a half-press state, a process in the adjustment/fixing state (FIG. 3) is performed (step S103). Then, a process of displaying a composition candidate is performed.

In the process of displaying a composition candidate, if the number of composition candidates at the time is n, a candidate i that is to be displayed is selected from among the n candidates (step S104), and a screen combined with the frame of the composition candidate i is displayed (step S105).

In a state where the screen combined with the frame of the composition candidate i is displayed, the control unit 110 determines whether the half-press of the shutter button has been released (step S106). If the half-press has been released, the process returns to step S102.

If the half-press of the shutter button has not been released, the control unit 110 determines whether the shutter button has been brought into a full-press state (step S107). If the shutter button is not in the full-press state, the control unit 110 determines whether time T has elapsed since display of the frame of the current composition candidate i started (step S108). The time T is a relatively short time of about two to three seconds that is set in advance.

If the time T has not elapsed, the process returns to step S106. If the time T has elapsed, the control unit 110 determines whether the shutter button has been brought into a fill-press state (step S109). If the shutter button is not in the full-press state, the process returns to step S104, and the same process is repeated on another composition candidate among the n composition candidates. Thus, in a state where the half-press state continues, the frames of the n composition candidates are displayed one after another at the time intervals of T.

If the control unit 110 determines in step S107 or step S109 that the shutter button has been brought into a full-press state, an image taking process of storing the image data based on the output of the image sensor 212 at the time in the memory 108 is performed (step S110). At this time, image data is extracted using the frame of the composition candidate that is displayed in step S105, and image capturing is performed using the composition.

In the process of sequentially displaying a plurality of composition candidates, the composition candidates are displayed in descending order of a composition adaptive index (described below).

Alternatively, a composition candidate that has been frequently selected by the operator may be preferentially displayed.

That is, the initial value of the selection frequency of each composition rule is set one, and the value of the selection frequency of a selected composition is incremented by one every time the operator performs image capturing in the composition assistant mode. The selection frequency ratio of each composition rule with respect to the total sum of selection frequencies is calculated, normalization is performed so that the maximum value thereof becomes one, and a selection history coefficient of each composition rule is obtained. Then, the composition adaptive indexes of the respective composition candidates are multiplied by the respective selection history coefficients of the compositions, the indexes are arranged in descending order, and the candidates are sequentially displayed in descending order of the index.

In a case where a plurality of composition candidates are generated, all the generated composition candidates may be displayed in order. Alternatively, a composition candidate of which composition adaptive index is a certain value or less may be excluded from the candidates to be displayed. Alternatively, the number of composition candidates to be displayed (n) may be determined in advance, and the n candidates may be displayed in descending order of the composition adaptive index.

4. Example of Process of Selecting Composition Candidate According to Embodiment Next, an example of a process of generating composition candidates will be described with reference to the flowchart in FIG. 5.

The process of generating composition candidates is performed by the composition analyzing unit 217 under control performed by the image capturing control unit 201 on the basis of an instruction provided from the control unit 110.

First, the number of subjects detected by the subject detecting unit 216 is determined from an image based on the current output of the image sensor 212 (step S201). Here, the number of subjects is the number of rectangles defining the ranges where subjects exist. A specific example of the subject rectangles will be described below. Here, it is determined whether the number of subject rectangles is one, two, or three or more.

If it is determined in step S201 that the number of subject rectangles is one, a composition candidate generation process based on a rule of thirds is performed (step S202).

If it is determined in step S201 that the number of subject rectangles is two, a composition candidate generation process based on a diagonal rule is performed (step S203). Furthermore, a composition candidate generation process based on integration of all subjects is performed (step S204).

If it is determined in step S201 that the number of subject rectangles is three or more, a composition candidate generation process based on integration of all subjects is performed (step S205). Furthermore, a composition candidate generation process based on the rule of thirds is performed (step S206).

Furthermore, the following composition candidate generation process is performed in a case where the number of subject rectangles is any of the foregoing numbers.

That is, a composition candidate generation process based on horizontal arrangement is performed (step S207), and a composition candidate generation process based on vertical arrangement is performed (step S208). Then, the indexes of the degrees of adaptation of the composition rules are calculated and weighting is performed (step S209), and the process ends. In the calculation of the indexes and the weighting, composition adaptive indexes representing how much the individual composition candidates are adaptive to the individual composition rules are calculated, and weighting is performed using a coefficient obtained from the history of composition that was selected by the operator.

Then, a plurality of obtained composition candidates are sorted in descending order of the composition adaptive index that is weighted with the coefficient, and the composition candidates are displayed in the sorted order.

The composition candidate generation process based on horizontal arrangement and the composition candidate generation process based on vertical arrangement may be selectively performed in accordance with the shape of a subject rectangle: whether the shape is vertically long or horizontally long. For example, if the shape of the subject rectangle is vertically long, the composition candidate generation process based on vertical arrangement is performed. If the shape of the subject rectangle is horizontally long, the composition candidate generation process based on horizontal arrangement is performed.

In a case where such composition candidates are generated, the orientation of the casing constituting the main body of the mobile phone terminal apparatus 100, which is an image capturing apparatus, may be determined.

Figure 6:
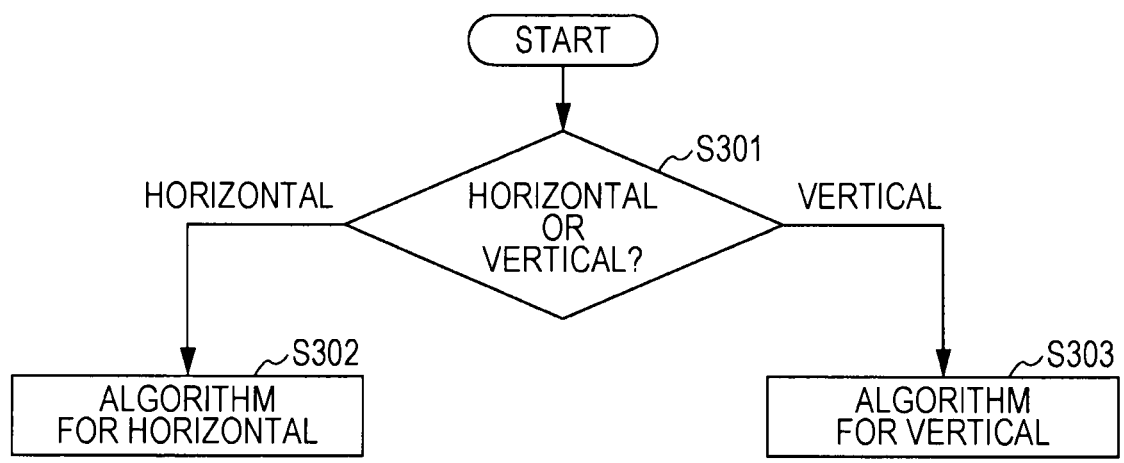
FIG. 6 is a flowchart illustrating an example of a process that is performed in accordance with the orientation of the apparatus according to an embodiment of the present disclosure.

That is, as illustrated in the flowchart in FIG. 6, for example, the control unit 110 determines whether the main body of the apparatus is horizontally oriented or vertically oriented on the basis of the output of the sensor 109 of the mobile phone terminal apparatus 100 (step S301). Here, the horizontal orientation means the orientation in which an image is captured with a horizontally long frame, and the vertical orientation means the orientation in which an image is captured with a vertically long frame.

If the control unit 110 determines that the main body of the apparatus is horizontally oriented, a candidate generation process is performed in accordance with the number of subject rectangles using a composition candidate generation process algorithm that is set for horizontal orientation (step S302). On the other hand, if the control unit 110 determines that the main body of the apparatus is vertically oriented, a candidate generation process is performed in accordance with the number of subject rectangles using a composition candidate generation process algorithm that is set for vertical orientation (step S303).

5. Specific Examples of Composition Candidate According to Embodiment

Next, specific examples of individual composition candidate generation processes will be described with reference to FIGS. 7 to 15.

Figure 7:
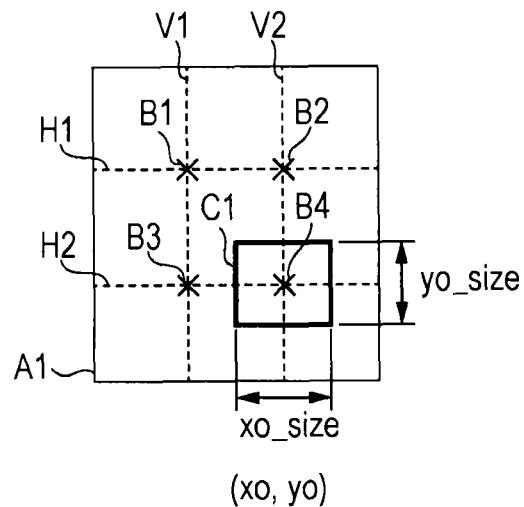
FIG. 7 is an explanatory view illustrating an example of a composition candidate generation process based on a rule of thirds according to an embodiment of the present disclosure.

FIG. 7 illustrates an example of a composition candidate generation process based on the rule of thirds.

As illustrated in FIG. 7, when the horizontal width of a detected subject rectangle C1 is x0 and when the vertical width thereof is y0, the center point of the subject rectangle C1 is placed at each of the positions that match the intersections of dividing lines that vertically and horizontally divide the screen into three portions, respectively (nine portions in total).

Specifically, when vertical dividing lines V1 and V2 and horizontal dividing lines H1 and H2 for vertically and horizontally dividing the screen into three portions, respectively, are set, the individual intersections B1, B2, B3, and B4 are set, and each of the four intersections B1, B2, B3, and 134 is matched with the center of the subject rectangle C1. Accordingly, in the rule of thirds, a maximum of four candidates that are positioned at the four intersections are generated.

The size A1 of the image to be extracted is set on the basis of the ratio between the horizontal width x0 and the vertical width y0 of the subject rectangle C1, for example.

A composition adaptive index for the rule of thirds is calculated in the following manner in accordance with the degree of match between the center of the subject rectangle and the intersection of dividing lines and the degree of match between the area of the subject rectangle and the extracted area.

$$100/\{\text{square root of absolute value of } 1+(\text{distance between center of subject rectangle and intersection of dividing lines})+(\text{area of subject rectangle}\times 9-\text{extracted area})\}$$

The subject rectangle C1 is a rectangle that is set so that a detected subject is included therein. For example, if the face of a subject is detected, the subject rectangle C1 is set so that the detected face is included therein. If the detected subject is an entire person, the subject rectangle C1 is set so that the entire person is included therein. In this way, the subject rectangle is set in various forms in accordance with a detection state of a subject.

Figure 8:
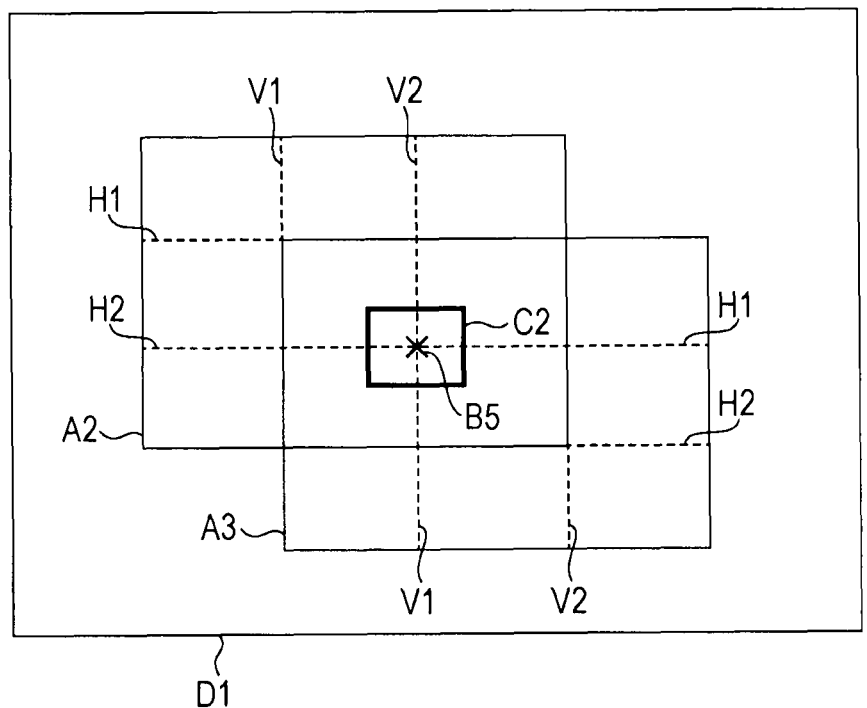
FIG. 8 is an explanatory view illustrating an example of composition candidates according to an embodiment of the present disclosure.

FIG. 8 illustrates an example in which two composition candidates are generated in accordance with the rule of thirds. In this example, one subject rectangle C2 exists at the center of a captured image D1.

In this example, a composition candidate A2 in which the subject rectangle C2 is positioned on lower-right in the rule of thirds and a composition candidate A3 in which the subject rectangle C2 is positioned on upper-left in the rule of thirds are generated.

Figure 9:
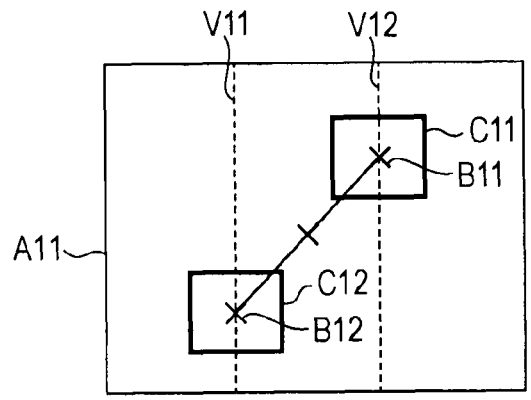
FIG. 9 is an explanatory view illustrating a first example of a composition candidate generation process based on a diagonal rule according to an embodiment of the present disclosure.
Figure 10:
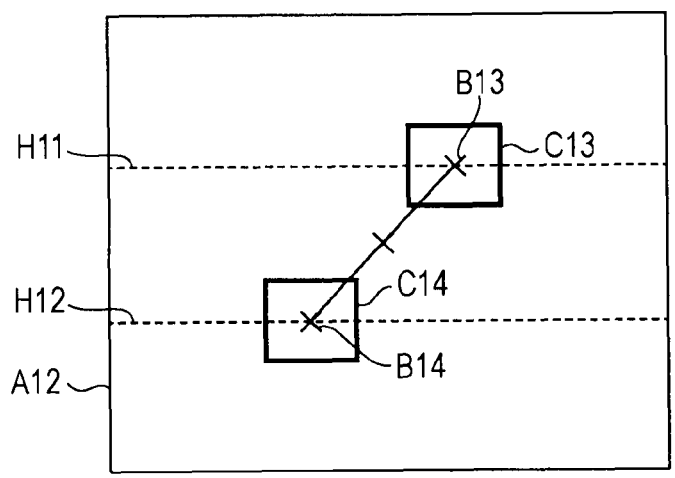
FIG. 10 is an explanatory view illustrating a second example of a composition candidate generation process based on the diagonal rule according to an embodiment of the present disclosure.

FIGS. 9 and 10 are diagrams illustrating examples of generating composition candidates in accordance with the diagonal rule. In these examples, there are two subject rectangles.

In the example illustrated in FIG. 9, dividing lines V11 and V12 for dividing an extracted image A11 into three portions in the vertical direction are set, and centers B11 and B12 of subject rectangles C11 and C12 are positioned on the two vertical dividing lines V11 and V12. In this case, the size of the extracted image A11 is set on the basis of the ratio with respect to the subject rectangles C11 and C12.

In the example illustrated in FIG. 10, dividing lines H11 and H12 for dividing an extracted image A12 into three portions in the horizontal direction are set, and centers B13 and B14 of subject rectangles C13 and C14 are positioned on the two horizontal dividing lines H11 and H12. In this case, too, the size of the extracted image A12 is set on the basis of the ratio with respect to the subject rectangles C13 and C14.

In this case of the diagonal rule, a composition adaptive index is calculated in the following manner on the basis of the degree of match between the slope of a diagonal line of the extracted rectangle and the slope of the line connecting the centers of the two subject rectangles.

$$100/\{\text{absolute value of } 1+(\arctan(\text{slope of diagonal line of extracted rectangle})-\arctan(\text{slope of line connecting centers of two subject rectangles}))\}$$

Figure 11:
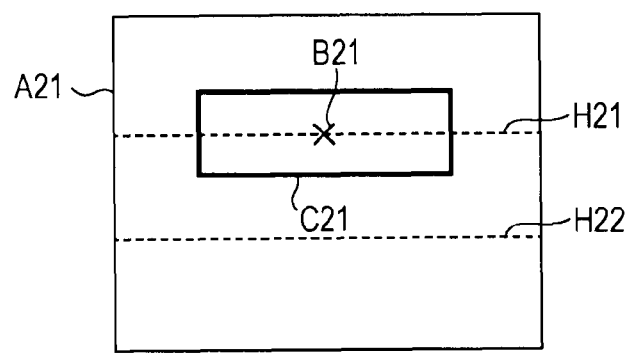
FIG. 11 is an explanatory view illustrating a first example of a composition candidate generation process based on horizontal arrangement according to an embodiment of the present disclosure.
Figure 12:
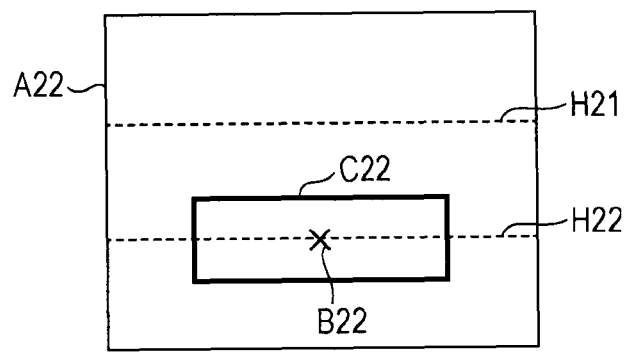
FIG. 12 is an explanatory view illustrating a second example of a composition candidate generation process based on horizontal arrangement according to an embodiment of the present disclosure.

FIGS. 11 and 12 are diagrams illustrating examples of generating a composition candidate using horizontal arrangement.

In the example illustrated in FIG. 11, horizontal dividing lines H21 and H22 for dividing an extracted image A21 into three portions in the horizontal direction are set, and a center B21 of a subject rectangle C21 is placed at substantially the center of the horizontal dividing line H21 on the upper side among the two horizontal dividing lines H21 and H22.

In the example illustrated in FIG. 12, horizontal dividing lines H21 and H22 for dividing an extracted image A22 into three portions in the horizontal direction are set, and a center B22 of a subject rectangle C22 is placed at substantially the center of the horizontal dividing line H22 on the lower side among the two horizontal dividing lines H21 and H22.

In those examples of generating a composition candidate using horizontal arrangement, an extracted rectangle in which the center of a subject rectangle matches one of the horizontal dividing lines is set as a composition candidate, and the composition adaptive index is calculated on the basis of the aspect ratio of the subject rectangle.

$$100/\{1+(\text{height of subject rectangle}/\text{horizontal width of subject rectangle})\}$$

Figure 13:
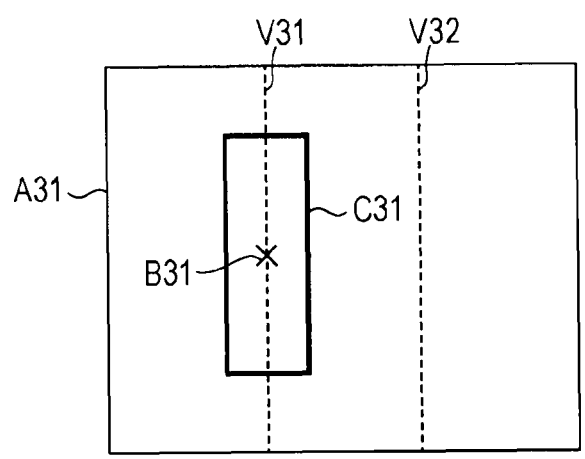
FIG. 13 is an explanatory view illustrating a first example of a composition candidate generation process based on vertical arrangement according to an embodiment of the present disclosure.
Figure 14:
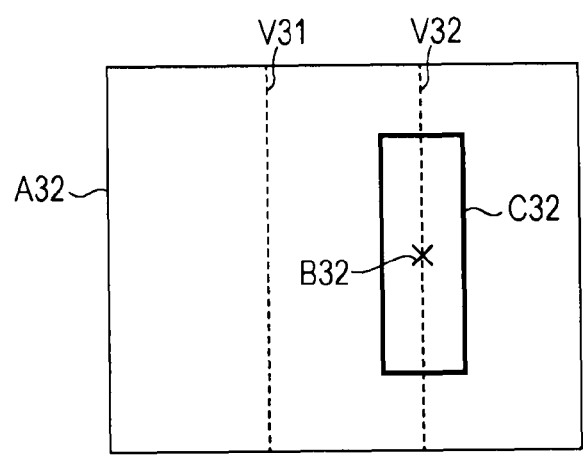
FIG. 14 is an explanatory view illustrating a second example of a composition candidate generation process based on vertical arrangement according to an embodiment of the present disclosure.

FIGS. 13 and 14 are diagrams illustrating examples of generating a composition candidate using vertical arrangement.

In the example illustrated in FIG. 13, vertical dividing lines V31 and V32 for dividing an extracted image A31 into three portions in the vertical direction are set, and a center B31 of a subject rectangle C31 is placed at substantially the center of the vertical dividing line V31 on the left among the two vertical dividing lines V31 and V32.

In the example illustrated in FIG. 14, vertical dividing lines V31 and V32 for dividing an extracted image A32 into three portions in the vertical direction are set, and a center B32 of a subject rectangle C32 is placed at substantially the center of the vertical dividing line V32 on the right among the two vertical dividing lines V31 and V32.

The sizes of the extracted images A31 and A32 in the respective cases are set on the basis of the ratio with respect to the sizes of the subject rectangles C31 and C32, respectively.

In those examples of generating a composition candidate using horizontal arrangement, an extracted rectangle in which the center of a subject rectangle matches one of the vertical dividing lines is set as a composition candidate, and the composition adaptive index is calculated on the basis of the aspect ratio of the subject rectangle.

$$100/\{1+(\text{horizontal width of subject rectangle}/\text{height of subject rectangle})\}$$

Figure 15:
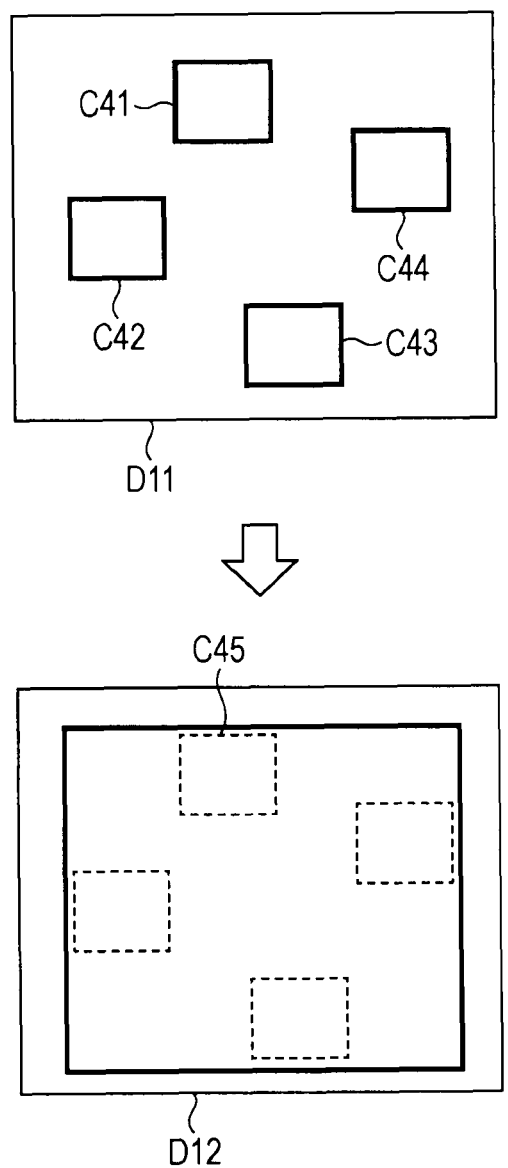
FIG. 15 is an explanatory view illustrating a composition candidate generation process based on an all subjects integration rule according to an embodiment of the present disclosure.

FIG. 15 illustrates an all subjects integration method.

In the example illustrated in FIG. 15, in a case where four subject rectangles C41, C42, C43, and C44 exist in an original image D11, a frame C45 defining the range to be extracted from the original image D12 is set so that the four subject rectangles C41, C42, C43, and C44 are arranged in a good balance.

6. Specific Display Examples According to Embodiment

Next, display examples at the time of image capturing will be described with reference to FIGS. 16 to 18B.

Figure 16:
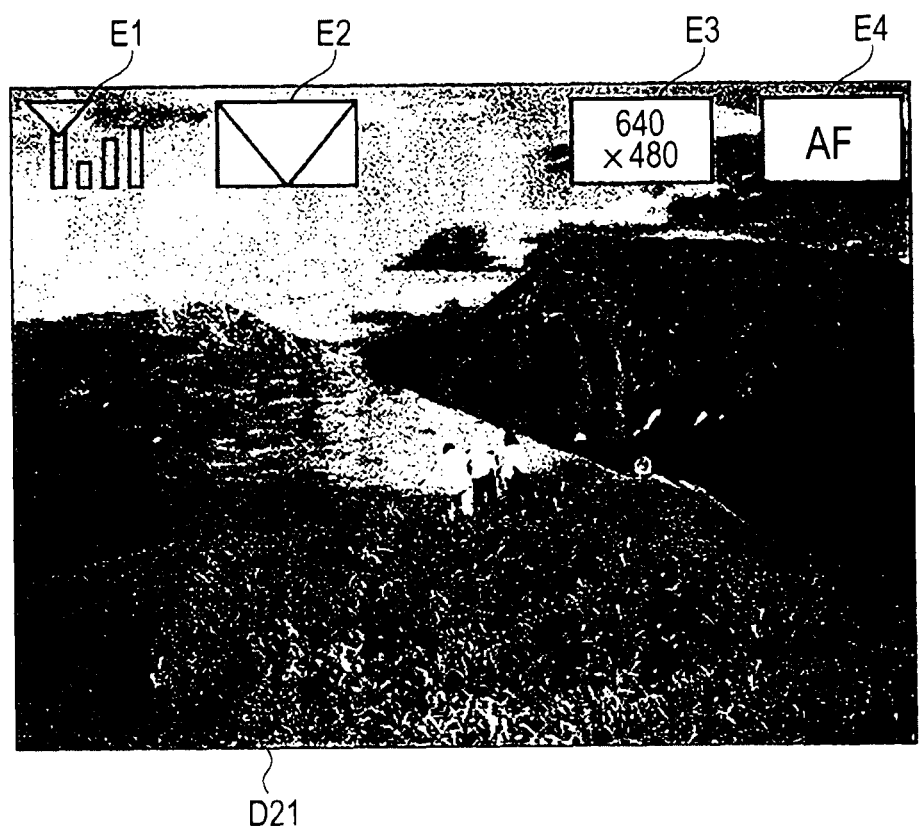
FIG. 16 is an explanatory view illustrating a display example of a through image according to an embodiment of the present disclosure.

FIG. 16 illustrates a display example of a through image. In this example, an image D21 in which the output of the image sensor 212 is displayed on almost the entire screen is obtained. This screen includes guide displays E1, E2, E3, and E4 based on pieces of fixed UI data. Among them, the guide displays E1 and E2 relate to the communication function of the mobile phone terminal, and the guide displays E3 and E4 relate to a setting status of the camera function.

Here, assume that a subject, such as people, exists at substantially the center of the image D21.

Figure 17A:
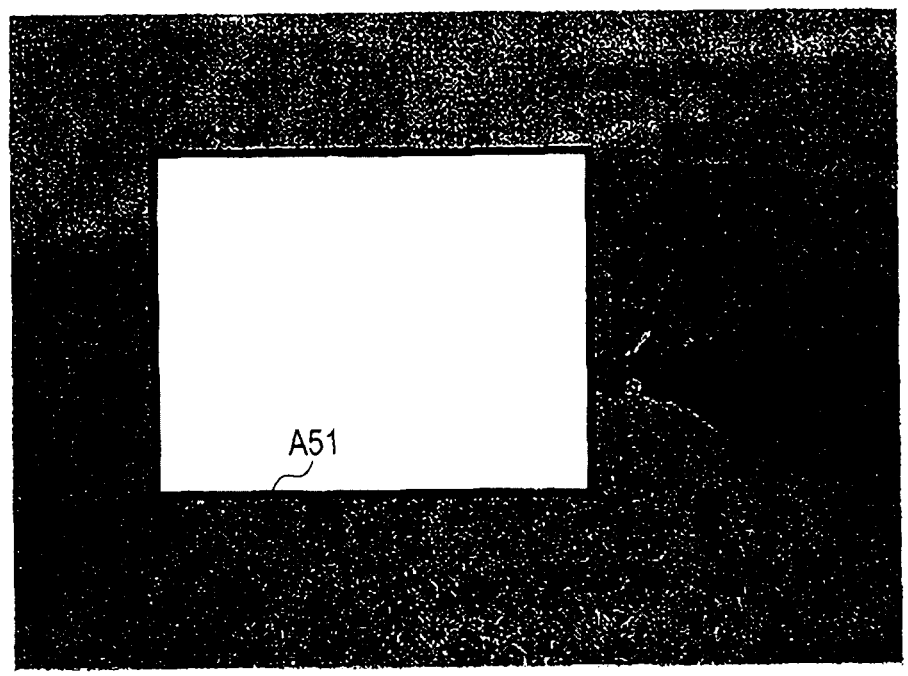
FIGS. 17A and 17B are explanatory views illustrating examples of a frame based on composition candidate data according to an embodiment of the present disclosure.
Figure 17B:
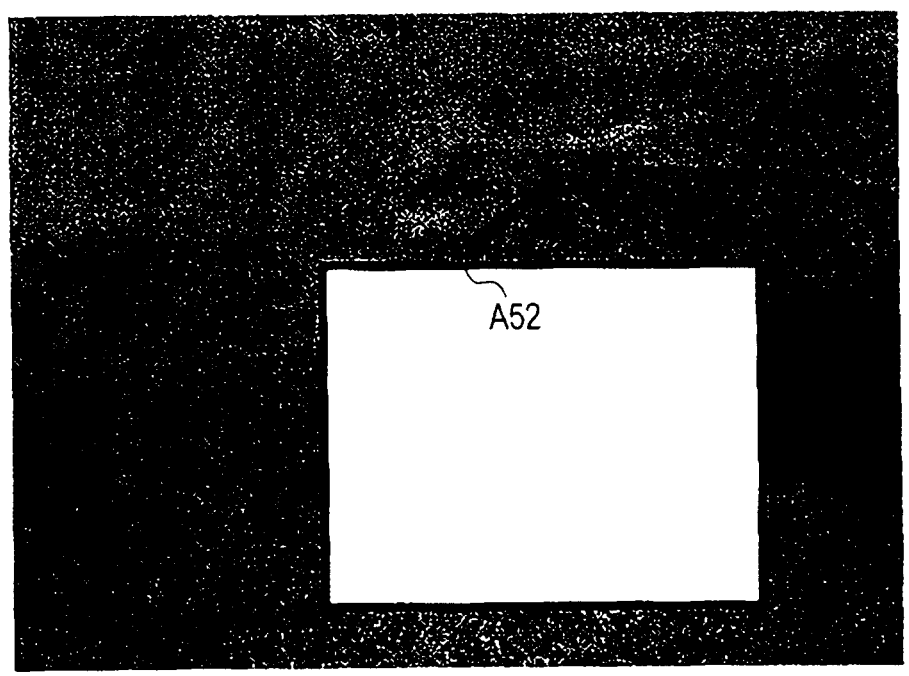

At this time, assume that frames A51 and A52 corresponding to two composition candidates illustrated in FIGS. 17A and 17B are generated in accordance with the rule of thirds on the basis of the detection of the subject at the center.

The frames A51 and A52 corresponding to the composition candidates are sequentially displayed while being combined with a captured image in step S23 in FIG. 3 where composition candidates are displayed.

Figure 18A:
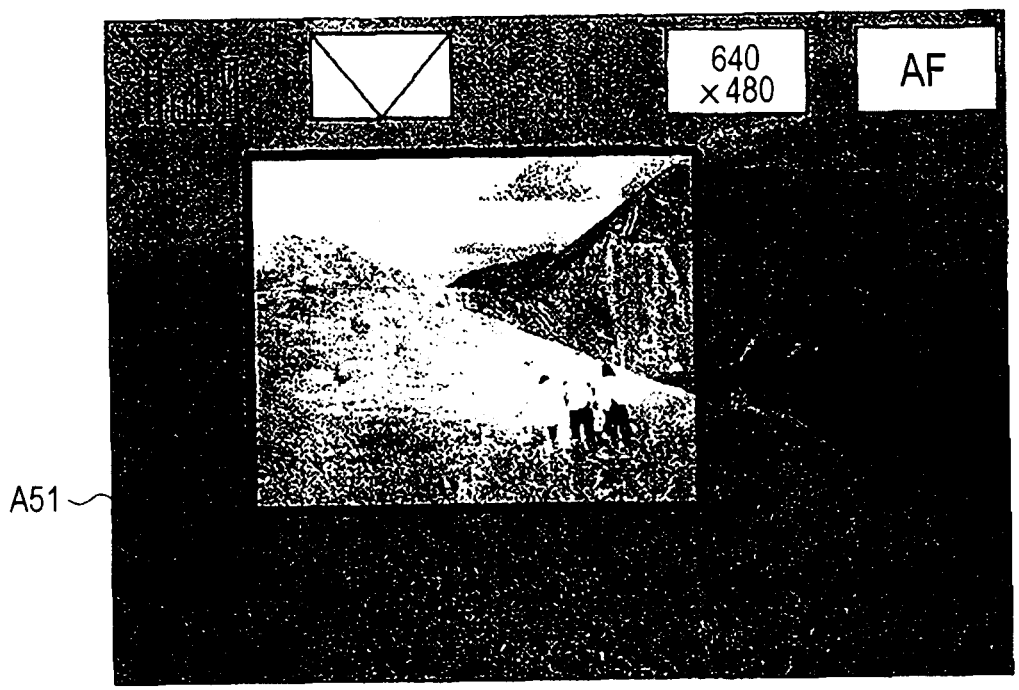
FIGS. 18A and 18B are explanatory views illustrating display examples in which a frame based on composition candidate data is combined according to an embodiment of the present disclosure.
Figure 18B:
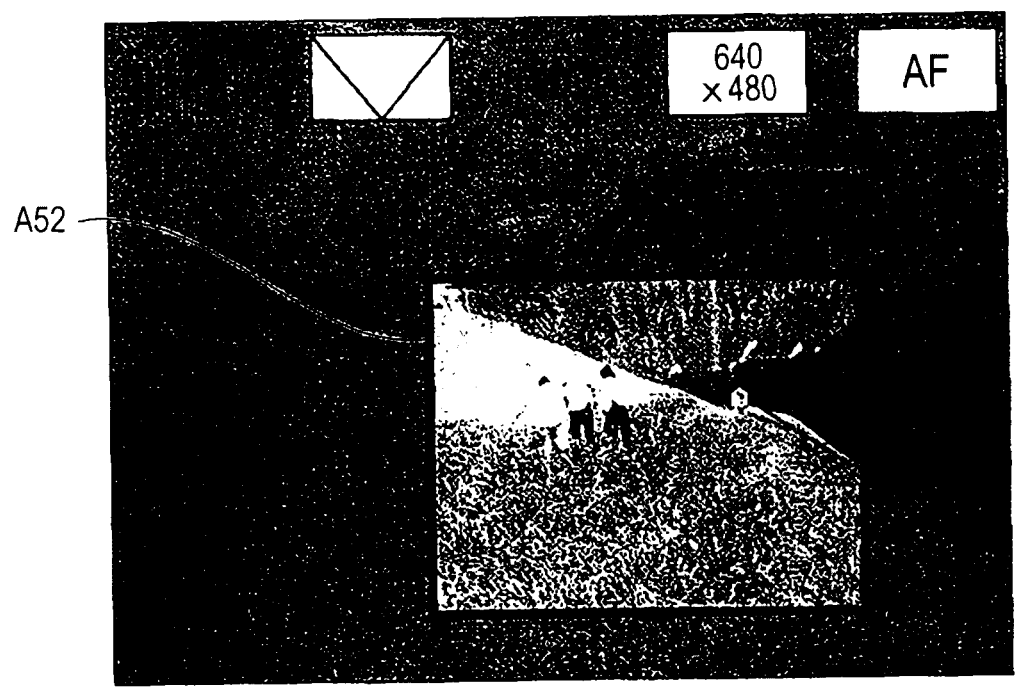

FIGS. 18A and 18B illustrate display examples of combined images.

At certain timing, as illustrated in FIG. 18A, a composition candidate in which the frame A51 is combined with the image is displayed while being superimposed on the image. After T seconds have elapsed from the display illustrated in FIG. 18A, a composition candidate in which the frame A52 is combined with the image is displayed while being superimposed on the image, as illustrated in FIG. 18B. Furthermore, after T seconds have elapsed from the display illustrated in FIG. 18B, the image illustrated in FIG. 18A is displayed again. Note that, if there is another composition candidate, the other composition candidate is also displayed, and all the composition candidates are sequentially displayed at intervals of T seconds. That is, as described above with reference to the flowcharts in FIGS. 5 and 6, the number of generated composition candidates varies in accordance with the number or state of subject rectangles, and the generated composition candidates are sequentially displayed.

The outside of the frame A51 in the display example in FIG. 18A and the outside of the frame A52 in the display example in FIG. 18B are displayed in a translucent manner with a decreased luminance. Alternatively, the outside of the frames A51 and A52 may be displayed without color. Alternatively, the outside of the frames 51 and 52 may be displayed in an ordinary manner.

Then, when the shutter button is fully pressed in a state where any of the composition candidates is displayed in the manner illustrated in FIGS. 18A and 18B, the image extracted with the composition at the time is stored.

In the examples illustrated in FIGS. 18A and 18B, the outside of the frames A51 and A52 is displayed with a decreased luminance.

In this way, an operator who performs an image capturing operation only performs the image capturing operation, such as an operation of the shutter button, whereby an appropriate composition is automatically detected in accordance with the position and size of the subject at the time, and candidates of the detected composition are displayed. Each of the candidates is displayed in a manner where the frame corresponding to the composite candidate is displayed in an entire captured image. Accordingly, the operator can intuitively determine the range to be extracted by seeing the display, and can appropriately determine whether the composition is appropriate. Particularly, when a plurality of composition candidates are obtained, the plurality of composition candidates are displayed sequentially and repeatedly, so that the operator can easily select an appropriate composition candidate.

Also, by confirming an image capturing operation in a stage where a desired composition candidate is displayed, the operator can easily perform an image capturing process with an appropriate composition advantageously.

7. Example of Process at the Time of Image Capturing According to Another Embodiment Next, a description will be given of another setting example of the composition assistant mode according to another embodiment of the present disclosure with reference to the state transition chart in FIG. 19. The apparatus configuration according to the foregoing embodiment illustrated in FIGS. 1 and 2 is applied as a basic configuration of an image capturing apparatus according to this embodiment.

The other setting example of the composition assistant mode will be described with reference to FIG. 19.

First, the image capturing function of the apparatus is started in the composition assistant mode (step S41), then a so-called through display state occurs in which an image captured by the image capturing unit 210 in that state is displayed as is on the display unit 106 (step S21). In this state, the subject detecting unit 216 performs a process of detecting a subject from the captured image, the combining unit 220 combines a frame serving as a subject rectangle, and the subject rectangle is displayed on the display unit 106. The display data of the frame as the subject rectangle is generated by the composition UI generating unit 219 (FIG. 2), for example. When a plurality of subjects are detected, a plurality of subject rectangles are displayed.

Assume that an operator who performs an image capturing operation selects any of the subject rectangles displayed on the display panel of the display unit 106 by performing a touch operation or the like in this state (step S42).

With this touch operation, the state changes to the adjustment/fixing state (step S22). In the adjustment/fixing state, an autofocus process of focusing a subject in the selected subject rectangle and a process of adjusting an exposure state are performed, and an image that is in a state where the focus is fixed and that is ready to be captured is displayed on the display unit 106.

If the area outside the subject rectangle on the display panel of the display unit 106 is touched in this state, the state returns to the through display state (step S43).

If a plurality of subject rectangles that are displayed are touched or touched and dragged simultaneously or sequentially in step S42, a plurality of subjects can be selected. If a plurality of subjects are selected, composition candidates including the plurality of subjects are generated thereafter.

After the state has changed to the adjustment/fixing state in step S22, then the state changes to the composition candidate display state (step S23) in step S44. In the composition candidate display state in step S23, composition UI data that is generated by the composition UI generating unit 219 (FIG. 2) is combined with a displayed image. In this state, a composition candidate is updated to another at certain time intervals (step S45). The composition candidates are those generated for the subject selected in step S42.

If the outside of the frame of the composition candidate on the display panel of the display unit 106 is touched in this state (step S46), the state returns to the through display state in step S21.

If the inside of the displayed frame of the composition candidate is touched in the composition candidate display state (step S47), an image taking process is performed in which the image data captured at the touch timing is extracted with the composition candidate that is displayed at the touch timing and the image data is taken (step S24). Then, the state returns to the through display state in step S21 (step S48).

With such a selection of a subject through a touch operation, composition candidates can be automatically displayed, and image capturing can be performed using the displayed composition candidates. In the example illustrated in FIG. 19, image capturing is performed with a touch operation. Alternatively, the image capturing may be performed through an operation of the shutter button.

8. Display Example of Subject Frame According to Another Embodiment

Figure 19:
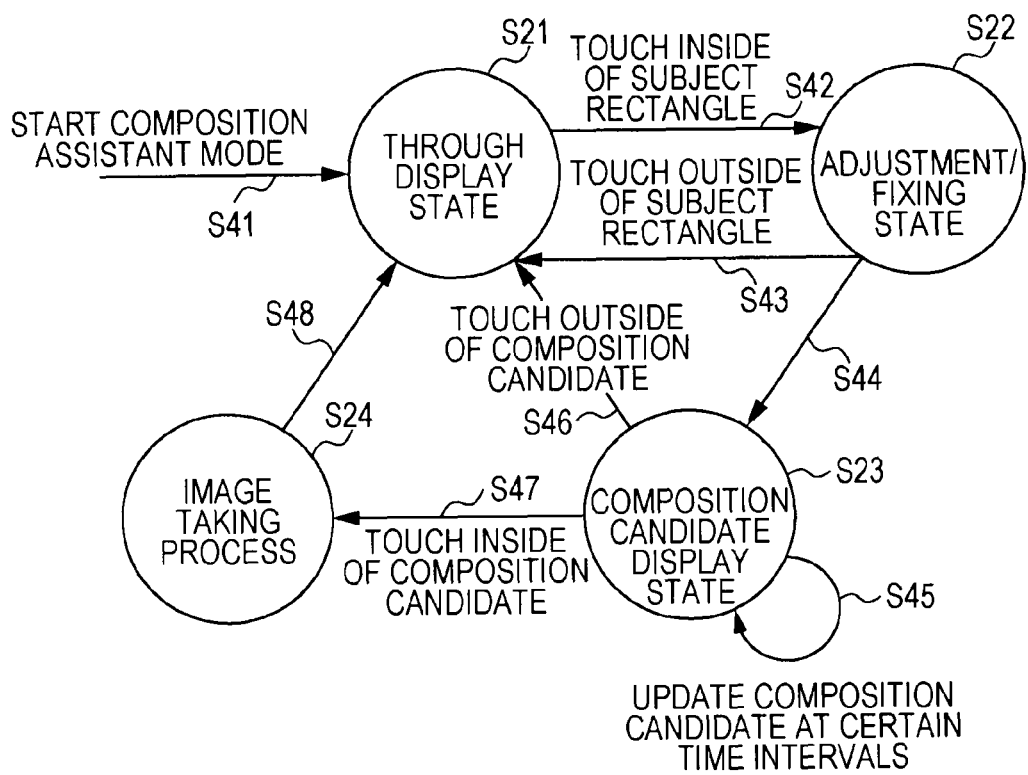
FIG. 19 is an explanatory view illustrating state transition at the time of image capturing according to another embodiment of the present disclosure.
Figure 20:
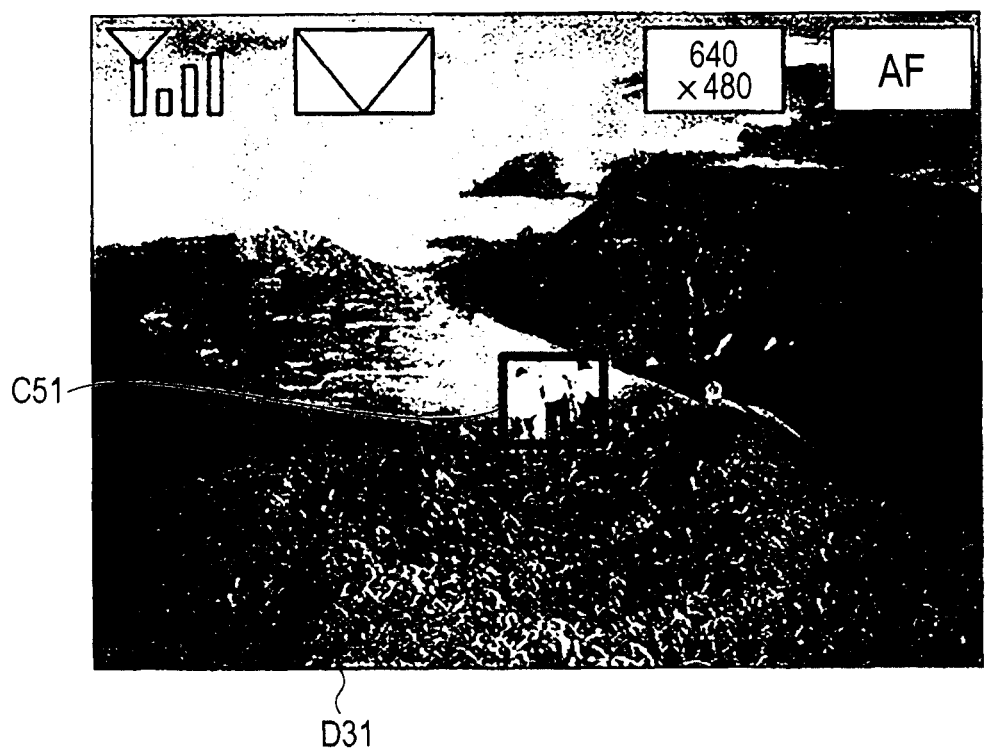
FIG. 20 is an explanatory view illustrating a display example of a frame of a subject according to another embodiment of the present disclosure.

FIG. 20 is a diagram illustrating a display example of a through image in a case where the process illustrated in FIG. 19 is performed. In this example, a subject such as people exists at substantially the center of an image D31, and a subject rectangle frame C51 defining the range of the subject is displayed.

If the subject rectangle frame C51 is touched and selected in a state where the display in FIG. 20 is performed on the display unit 106, a composition candidate generation process with reference to the subject is performed. The processes illustrated in the flowcharts in FIGS. 5 and 6 can be applied as the composition candidate generation process.

In this way, the operator can select a subject, whereby a composition candidate generation process that reflects the intention of the operator can be performed. Accordingly, more favorable composition candidates can be generated.

9. Other Modifications

In the above-described embodiments, an image capturing apparatus is applied to a mobile phone terminal apparatus.

Alternatively, an image capturing apparatus without a wireless communication function may be applied. Also, an image capturing apparatus combined with various types of electronic devices may be applied.

In the processing example illustrated in FIG. 3, the state is changed by an operation of the shutter button. Alternatively, change to another state or image capturing may be performed by a touch panel operation in the processing example illustrated in FIG. 3, as in the example illustrated in FIG. 19.

The configuration of the image capturing apparatus illustrated in FIGS. 1 and 2 is an example, and another configuration is also acceptable. For example, instead of providing the processing units for performing individual processes illustrated in FIG. 2, the same processes as those performed by the processing units may be performed by a program (software) that is executed in the image capturing apparatus, whereby the same processes may be performed in accordance with the execution of the program under control performed by the control unit.

In the processes according to the above-described embodiments, an image capturing process is performed on an image using the composition selected through an operation by the operator from among a plurality of composition candidates. Alternatively, an image capturing process may be simultaneously performed on the images of the other composition candidates, and the images may be stored in a memory or the like. Also, an image capturing process may be simultaneously performed on an entire displayed image, not an image extracted using a composition candidate, and the entire image may be stored.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
    an interface configured to receive a first input corresponding to an initiation of an image capture operation;
    an image capturing unit configured to capture an image based on the first input;
    circuitry configured to
        detect a subject from the captured image;
        generate a plurality of pieces of composition candidate data by trimming the captured image based on a size and position of the detected subject;
        sequentially combine each of the plurality of pieces of composition candidate data with the captured image;
        control a display to sequentially display, at predetermined time intervals, each of the plurality of pieces of composition candidate data combined with the captured image data, wherein
    the interface is configured to receive a second input corresponding to a completion of the image capture operation, and
    the circuitry is configured to perform an image taking process of storing one of the plurality of pieces of composition candidate data that is displayed when the second input is received.

2. The image capturing apparatus of claim 1, wherein the interface is configured to receive an input instructing adjustment of at least one of focus and exposure of the captured image.

3. The image capturing apparatus of claim 2, wherein the circuitry is configured to control the image capturing unit to adjust the at least one of focus and exposure of the captured image based on the received input.

4. The image capturing apparatus of claim 3, wherein the circuitry is configured to generate the plurality of pieces of composition candidate data based on the captured image on which the at least one of focus and exposure has been adjusted.

5. The image capturing apparatus of claim 1, wherein the circuitry is configured to control the display to display each of the plurality of pieces of composition candidate data in at least one of a different resolution and a different brightness than the captured image.

6. The image capturing apparatus of claim 1, further comprising:
    a sensor configured to detect an orientation of the image capturing apparatus.

7. The image capturing apparatus of claim 6, wherein the circuitry is configured to generate the plurality of pieces of composition candidate data based on an orientation of the image capturing apparatus detected by the sensor.

8. An image capturing method performed by an image capturing apparatus, the method comprising:
    receiving a first input corresponding to an initiation of an image capture operation;
    capturing an image based on the first input;
    detecting a subject from the captured image;
    generating a plurality of pieces of composition candidate data by trimming the captured image based on a size and position of the detected subject;
    sequentially combining each of the plurality of pieces of composition candidate data with the captured image;
    sequentially displaying at predetermined time intervals, at a display of the image capturing apparatus, each of the plurality of pieces of composition candidate data combined with the captured image data;
    receiving a second input corresponding to a completion of the image capture operation; and
    performing an image taking process of storing at least one of the plurality of pieces of composition candidate data that is displayed when the second input is received.

9. A non-transitory computer-readable medium including computer program instructions, which when executed by an image capturing apparatus, causes the image capturing apparatus to perform a method comprising:
    receiving a first input corresponding to an initiation of an image capture operation;
    capturing an image based on the first input;
    detecting a subject from the captured image;
    generating a plurality of pieces of composition candidate data by trimming the captured image based on a size and position of the detected subject;
    sequentially combining each of the plurality of pieces of composition candidate data with the captured image;
    sequentially displaying at predetermined time intervals each of the plurality of pieces of composition candidate data combined with the captured image data;
    receiving a second input corresponding to a completion of the image capture operation; and
    performing an image taking process of storing at least one of the plurality of pieces of composition candidate data that is displayed when the second input is received.

* * * * *